(12) United States Patent
Albert

(10) Patent No.: US 10,381,930 B2
(45) Date of Patent: Aug. 13, 2019

(54) THREE-PORT DIRECT CURRENT CONVERTER

(71) Applicant: Danmarks Tekniske Universitet, Kgs. Lyngby (DK)

(72) Inventor: Maria Del Carmen Mira Albert, Bjerringbro (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/568,649

(22) PCT Filed: Apr. 25, 2016

(86) PCT No.: PCT/EP2016/059174
§ 371 (c)(1),
(2) Date: Oct. 23, 2017

(87) PCT Pub. No.: WO2016/170184
PCT Pub. Date: Oct. 27, 2016

(65) Prior Publication Data
US 2018/0159430 A1   Jun. 7, 2018

(30) Foreign Application Priority Data
Apr. 23, 2015   (EP) ..................................... 15164905

(51) Int. Cl.
*H02M 3/158*     (2006.01)
*H02J 7/35*      (2006.01)
(Continued)

(52) U.S. Cl.
CPC ............. *H02M 3/1582* (2013.01); *H02J 7/35* (2013.01); *H02M 1/00* (2013.01);
(Continued)

(58) Field of Classification Search
CPC ......... G05F 1/62; H02M 3/1582; H02M 1/00; H02J 7/35
See application file for complete search history.

(56) References Cited

U.S. PATENT DOCUMENTS 7,723,965 B2 * 5/2010 Lesso .................... H02M 3/158
                                                    323/225
2011/0012551 A1 * 1/2011 Tseng .................... H02J 7/0065
                                                    320/101

(Continued)

FOREIGN PATENT DOCUMENTS

| CN | 102629825 A | 8/2012 |
| CN | 101860218 B | 9/2012 |
| CN | 202616999 U | 12/2012 |

OTHER PUBLICATIONS

Hongfei Wu, Yan Xing, Yanbing Xia, Kai Sun, A Family of Non-Isolated Three-Port Convert-ers for Stand-Alone Renewable Power System, IECON 2011—37th Annual Conference on IEEE Industrial Electronics Society, DOI: 10.1109/IECON.2011.6119337.

(Continued)

*Primary Examiner* — Adolf D Berhane
*Assistant Examiner* — Afework S Demisse
(74) *Attorney, Agent, or Firm* — Dinsmore & Shohl LLP

(57) ABSTRACT

The three-port direct current converter comprising: at least one input direct current source; at least one storage battery; a primary side circuit; a secondary side circuit; a first single magnetic component shared by the primary side circuit and the secondary side circuit, wherein the primary side circuit comprises a connection between the at least one input direct current source and the at least one storage battery, the primary side circuit configured for operating as a buck converter; a second magnetic component serially coupled to the first single magnetic component, wherein the first and (Continued)

second magnetic components are configured to perform a voltage step-up, wherein the secondary side circuit comprises a connection between the at least one storage battery and at least one load, the secondary side configured for operating as a tapped boost converter; wherein the three-port direct current converter is configured to operate in two mutually exclusive power flow configurations.

14 Claims, 11 Drawing Sheets

(51) Int. Cl.
*H02M 1/00* (2006.01)
*H05B 33/08* (2006.01)

(52) U.S. Cl.
CPC . *H05B 33/0815* (2013.01); *H02M 2001/0009* (2013.01); *H02M 2001/009* (2013.01); *H02M 2001/0064* (2013.01); *H02M 2001/0067* (2013.01); *Y02B 20/347* (2013.01)

(56) References Cited

U.S. PATENT DOCUMENTS

| 2012/0243267 | A1 | 9/2012 | Kassayan |
| 2013/0141070 | A1* | 6/2013 | Goessling ............. H02M 3/156 323/284 |
| 2013/0193775 | A1 | 8/2013 | Lee et al. |

OTHER PUBLICATIONS

Maria C. Mira, Arnold Knott, Michael A. E. Andersen, A Three-Port Topology Comparison for a Low Power Stand-Alone Photovoltaic System, Power Electronics Conference (IPEC-Hiroshima 2014—ECCE-ASIA), 2014 International, 10.1109/IPEC.2014.6869631.

Yu Chen et al.; "A Family of Cost-Efficient Non-isaolated Single-Inductor Three-Port Converters for Low Power Stand Alone Renewable Power Applications"; 28th Annual IEEE, 2013.

Zihu Zhou, Hongfei Wu, Xudong Ma, Van Xing, A Non-Isolated Three-Port Converter for Stand-Alone Renewable Power System, IECON 2012—38th Annual Conference on IEEE Industrial Electronics Society, DOI: 10.1109/IECON.2012.6389360.

* cited by examiner

THREE-PORT DIRECT CURRENT CONVERTER

CROSS-REFERENCE TO RELATED APPLICATIONS

This application is the U.S. national stage of PCT/EP2016/059174 filed Apr. 25, 2016, which claims priority of European Patent Application 15164905.0 filed Apr. 23, 2015. The entire contents of these applications are incorporated herein by reference in their entirety.

FIELD OF THE INVENTION

The invention relates to a three-port direct current converter, operating in two mutually exclusive power flow configurations, sharing a magnetic component.

BACKGROUND OF INVENTION

Solar energy is one of the fastest growing renewable energy sources mainly because sunlight is the most abundant source of energy and is unlimited, clean and free. The major advantage of solar energy is the transformation of energy with zero carbon dioxide ($CO_2$) emissions. However, the main drawback is that the energy source is intermittent in nature since it strongly depends on the weather conditions. In order to overcome this limitation, energy storage elements are often required in order to provide a constant power source.

Multi-input converters (MIC) topologies address the issue of interconnecting several energy sources with a single power converter. The conventional approach to implement multi-input power systems is to interconnect the elements using different series or parallel connected power converters. However, the disadvantages are low power density and efficiency due to multiple conversions stages. The solution is to implement a multipart converter, which can interface with renewable energy sources, storage elements and loads.

Recently introduced three-port converter (TPC) topologies are based on reduced energy processing and shared components and claim to achieve high efficiency and power density. TPCs can be said to have fewer conversion stages and generally higher efficiency compared to solutions employing several independent two-port converters. However, in TPCs it is required to add extra switches to provide controllability and/or diodes to configure the power flow paths. TPC topologies need a high number of semiconductors.

FIG. 1 shows the concept of a conventional three-port converter. The three-port converter has an input voltage port, a battery port, and a load, to which power is delivered.

SUMMARY OF INVENTION

The present disclosure relates to a topology for a three-port direct current converter comprising: at least one input direct current source; at least one storage battery; a primary side circuit; a secondary side circuit; a first single magnetic component shared by the primary side circuit and the secondary side circuit, wherein the primary side circuit comprises a connection between the at least one input direct current source and the at least one storage battery, the primary side circuit configured for operating as a buck converter; a second magnetic component serially coupled to the first single magnetic component, wherein the first and second magnetic components are configured to perform a voltage step-up, wherein the secondary side circuit comprises a connection between the at least one storage battery and at least one load, the secondary side configured for operating as a tapped boost converter, wherein the three-port direct current converter is configured to operate in two mutually exclusive power flow configurations. In the presently disclosed three-port direct current converter, the first output voltage may be lower than the second output voltage.

Preferably the converter comprises a second magnetic component serially coupled to the first single magnetic component, wherein the first and second magnetic components are configured to perform a voltage step-up, wherein the secondary side circuit comprises a connection between the at least one storage battery and at least one load, the secondary side configured for operating as a tapped boost converter; wherein the three-port direct current converter is configured to operate in two mutually exclusive power flow configurations. In some lighting applications, single LEDs need to be combined into arrays to form LED lamps. In such applications it may be an advantage to connect the LEDs in series in order to avoid mismatch in the current causing differences in the LED brightness. Moreover, in order to achieve high luminous efficiency, the LEDs may be driven at a low current level, which increases the number of required LEDs for the same luminous output. Therefore, in order to drive several series-connected LEDs, a converter able to provide high step-up may be useful.

Furthermore, the presently disclosed three-port direct current converter may be used to avoid high duty cycle operation. The coupled magnetic components in the present application may serve the purpose of avoiding high duty cycle operation when operating as a tapped boost converter. The duty cycle may be for example lower than 0.7, or lower than 0.6, or lower than 0.5, or lower than 0.4, or lower than 0.3, or lower than 0.2, or lower than 0.1 and can be said to depend on the required ratio between the input and output voltage. Large step-up voltage ratios may require from coupled inductor structures to avoid high duty cycle operation, which is achievable with the presently disclosed circuit structure.

A first single magnetic component shared by the primary side circuit and the secondary side circuit and a second magnetic component serially coupled to the first single magnetic component may in the scope of the present disclosure also be interpreted as one magnetic component having a primary winding $L_{1A}$ and a secondary winding $L_{1B}$, wherein the primary winding is shared by the primary side circuit and the secondary side circuit, whereas the primary and secondary windings are configured to perform a voltage step-up.

The inventor has realized that in particular in street light applications, wherein the input power source is solar energy, there is room for optimization of the conventional three-port converter topologies. When there is daylight, there is no need for the street light to be active, and therefore the three-port converter can operate as a buck converter, wherein the power input charges the battery. The street light becomes active when there is no daylight, and in this power configuration the three-port converter operates as a boost converter, driving the load. These two modes can share a number of components. Compared to a conventional three-port converter, this means that there is no direct power flow from the power input to the load. In the converter proposed in the present invention, the single magnetic component may regulate a first output voltage of the primary side circuit in the first power flow configuration, and regulate a second output voltage of the secondary side circuit in the second power flow configuration. The three-port converter operating with a single magnetic component can be seen as a significant benefit compared to conventional three-port converters since magnetic components play an important role for the size, price and weight of the converter.

A further aspect of the presently disclosed invention relates to the three-port direct current converter configured to operate without diodes. The inventor has realized that if the three-port direct current converter operates with actively controlled switching elements, such as MOSFETs, configured to control power flows of three-port direct current converter, further advantages can be obtained. This technique is referred to as synchronous rectification or active rectification and reduces power drops in the power flow paths. The drawback of this technique is that typically extra gate control signals are needed for controlling the MOSFETs. In one embodiment of the present inventions all the switches are active switches in order to reduce voltage drops in the power flow path, where M5 and M4 are power flow path configuration switches, M2 acts as synchronous rectifier in buck mode and M3 operates as synchronous rectifier in boost/tapped boost mode. In one embodiment of the presently disclosed converter switches M4 and M5 are connected in buck and (tapped) boost mode, respectively, corresponding to the mutually exclusive power flow configurations, but not connected simultaneously. By combining the topology of the present invention, in which a single magnetic component is shared by a primary side circuit and a secondary side circuit, and synchronous rectification, a further optimized converter can be obtained, in which one MOSFET $M_2$ is shared between the primary side circuit and the secondary side circuit. Furthermore, with the proposed converter two of the MOSFETs are simple to drive since they only operate in two configurations (on/off) depending on which of the two mutually exclusive power flow configurations that is active. In summary this means that in one embodiment of the present invention, there are five MOSFETs, wherein one ($M_2$) is shared between the primary side circuit and the secondary side circuit, and wherein two of the other MOSFETs do not have to be dynamically driven (on/off depending on power flow configuration). FIG. 3 shows this embodiment.

DESCRIPTION OF DRAWINGS

The invention will in the following be described in greater detail with reference to the accompanying drawings. The drawings are exemplary and are intended to illustrate some of the features of the presently disclosed three-port direct current converter, and are not to be construed as limiting to the presently disclosed invention.

DETAILED DESCRIPTION OF THE INVENTION

Figure 1:
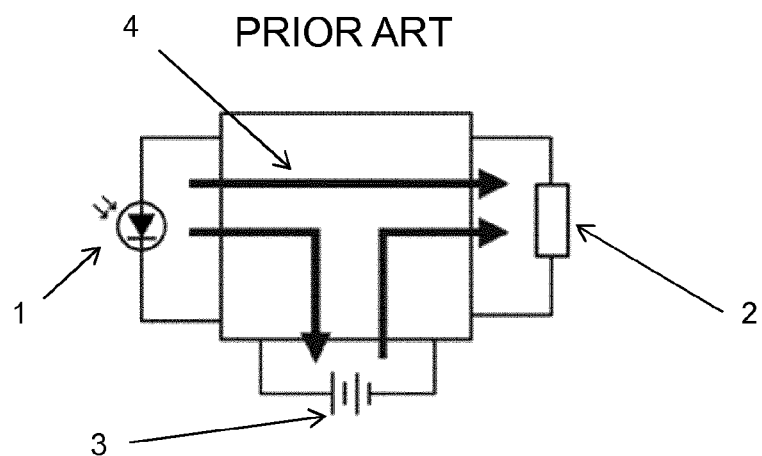
FIG. 1 shows a conventional three-port converter having an input power source, a battery and a load.

The present disclosure relates to a topology for a three-port direct current converter, in which a single magnetic component is shared by a primary side circuit and a secondary side circuit, by having the three-port direct current converter configured to operate in two mutually exclusive power flow configurations. Therefore, the invention relates to a three-port direct current converter comprising: at least one input direct current source; at least one storage battery; a primary side circuit; a secondary side circuit; a single magnetic component shared by the primary side circuit and the secondary side circuit, wherein the primary side circuit comprises a connection between the at least one input direct current source and the at least one storage battery, the primary side circuit configured for operating as a buck converter, wherein the secondary side circuit comprises a connection between the at least one storage battery and at least one load, the secondary side configured for operating as a boost converter, and wherein the three-port direct current converter is configured to operate in two mutually exclusive power flow configurations.

The proposed topology is a combination of two converters in a single magnetic component multi-port converter with at least one power input, at least one power output and at least one bidirectional power port. The proposed converter is based on the concept of shared components in order to increase the power density. Magnetic components play an important role in power density, weight and price. The topology uses a single magnetic component (L), which is shared between two mutually exclusive operating modes. The three-port direct current converter may operate as a buck converter charging the at least one storage battery in a first power flow configuration, and operate as a boost converter driving the at least one load in a second power flow configuration. The two mutually exclusive operating modes are 1) the circuit operating as a buck converter, wherein the input direct current source charges the at least one storage battery, and 2) the circuit operates as a boost converter, wherein the storage battery powers the at least one load. The possibility to share one single magnetic component can be seen as a result of realizing that if there is no direct power flow from the power input to the load, two mutually exclusive power flow configuration can be achieved, and by designing the voltage regulating parts, including a magnetic portion, a design can be achieved in which a single magnetic component can be shared between the two circuits (first and secondary). The inventor has realized that such a designed is suitable for light-to-light solutions, i.e. wherein the input power source is solar energy and the power output is a light, for example a street light. In principle, when there is daylight there is no need for the street light, and when there is no daylight it is not possible to charge the storage battery. These two cases may translate into the two mutually exclusive power flow configurations, and therefore the presently disclosed invention may be suitable for light-to-light solutions. Compared to a convention three-port converter, the presently disclosed invention can be seen as significant benefit since it is capable of operating with one single magnetic component. This is beneficial for the size, price and weight of the converter.

In one embodiment of the present invention the magnetic component is a first inductor. The conceptual model of a buck converter is best understood in terms of the relation between current and voltage of the inductor. Beginning with the switch open (in the "off" position), the current in the circuit is 0. When the switch is first closed, the current will begin to increase, and the inductor (L in the FIG. 3b example) will produce an opposing voltage across its terminals in response to the changing current. This voltage drop counteracts the voltage of the source and therefore reduces the net voltage across the load. For the present invention this means that the role of the magnetic component can be seen as regulating a first output voltage of the primary side circuit in the first power flow configuration. The first output voltage corresponds to the voltage of the at least one storage battery. The first output voltage may therefore be regulated to match a predefined voltage range of the at least one storage battery. The primary side circuit can also be said to operate as a voltage step down and current step up converter in a first power flow configuration.

The conceptual model of a boost converter can also be understood in terms of the relation between current and voltage of an inductor. In a boost converter, the output voltage is higher than the input voltage. In a boost converter, there is one state in which the current flows through the load and the inductor stores some energy by generating a magnetic field. In a second state, a switch is typically opened which increases the impedance, reduces the current, and, as a consequence, causes a higher voltage to charge the capacitor (C3 in the FIG. 3c example). When the switch is then closed the capacitor is able to provide the voltage and energy to the load. For the present invention this means that the role of the magnetic component can be seen as regulating a second output voltage of the secondary side circuit in the second power flow configuration. Optionally, the magnetic component can be said to regulating a second output voltage by using an additional capacitor. The second output voltage may therefore be regulated to match a predefined voltage range of the at least one load.

A further aspect of the presently disclosed invention relates to the secondary side circuit optionally comprising a second inductor serially coupled to the first inductor, wherein the first and second inductors are configured to perform a voltage step-up of the second output voltage. In this mode the topology operates as a tapped-boost converter, which provides high step-up ratio from the battery port. An example of such a topology can be found in FIG. 4a-c, wherein the component $L_{1B}$ is the second inductor. If the specification at the load of the secondary side circuit requires high step-up voltage; the output voltage can then be adjusted with the turns ratio between the two inductors, depending on the required output voltage.

In one embodiment, the at least one input direct current source comprises a photovoltaic panel. As stated above that the present invention is suitable for light-to-light solutions, i.e. wherein the input power source is solar energy. Therefore, in one embodiment the at least one input direct current source comprises a photovoltaic panel (solar panel). In principle, the topology also works for any other direct input source. Also relating to light-to-light solutions, one embodiment of the invention relates to the at least one load comprises at least one light source, including any electronically powered light sources, such as light-emitting diodes.

When designing a three-port converter, weather conditions, battery performance and load requirements have to be taken into consideration. In the example of a light-to-light solution the following factors are examples of factors that have to be taken into account: For how long will the battery have to power the light (i.e. how many dark hours during a 24 hour day)? What are the weather (sun) conditions? What is the input power during a day worst case? How much power does the load require? How much energy can the battery store? The presently proposed topology is power efficient and therefore eases the design choices in these respects. However, to further improve the system, the inventor has realized that by having a dimmable light source, the requirements on the rest of the system can be reduced. For example, if it has been a cloudy day and the battery has not been fully charged, the light source can be adjusted to use less power and thereby reduce the power consumption for the following night. In one embodiment direct current converter is configured to dim the light-emitting diode according to a state of charge requirement of the at least one storage battery. A further aspect of the present invention relates to the secondary side circuit comprising parallel-connected loads. A further aspect of the present invention relates to the fact that the secondary side circuit may comprise multiple loads. The proposed solution is power efficient and if several loads can be powered by the same storage battery, further efficiency can be achieved. In a further embodiment the multiple loads may be regulated independently. Since the power of the battery is limited it may be useful to implement a solution wherein the loads are regulated such that the optimal use of the resources is achieved with respect to the needs of the different loads.

Figure 3A:
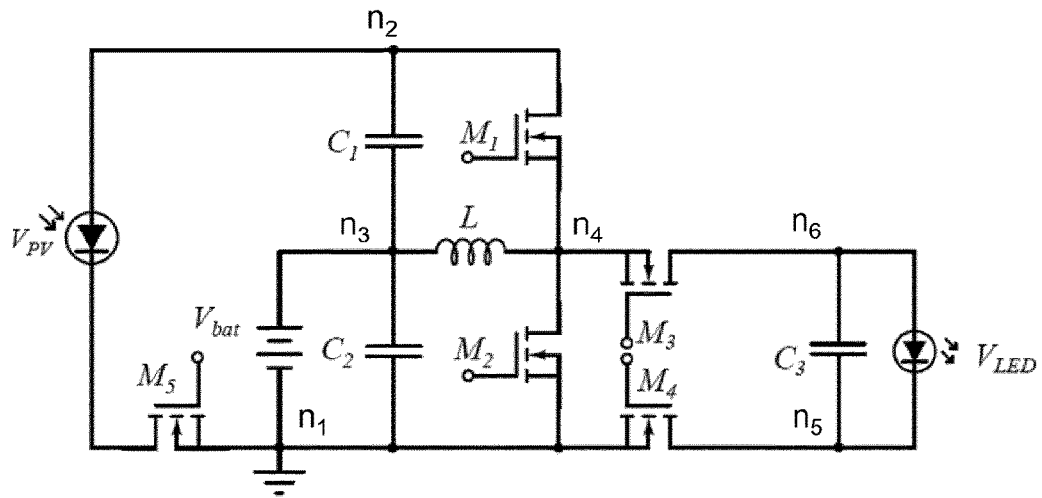
FIG. 3a shows an embodiment of a three-port converter according to the present invention, wherein a single magnetic component (L) is shared by the primary side circuit and the secondary side circuit.
Figure 3B:
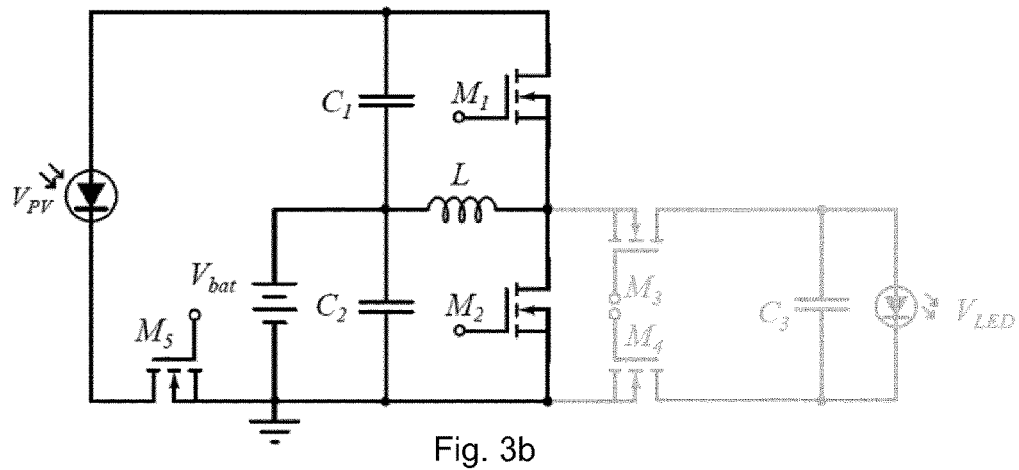
FIG. 3b shows the three-port converter in FIG. 3a, wherein the primary side circuit, configured for operating as a buck converter, is highlighted.
Figure 3C:
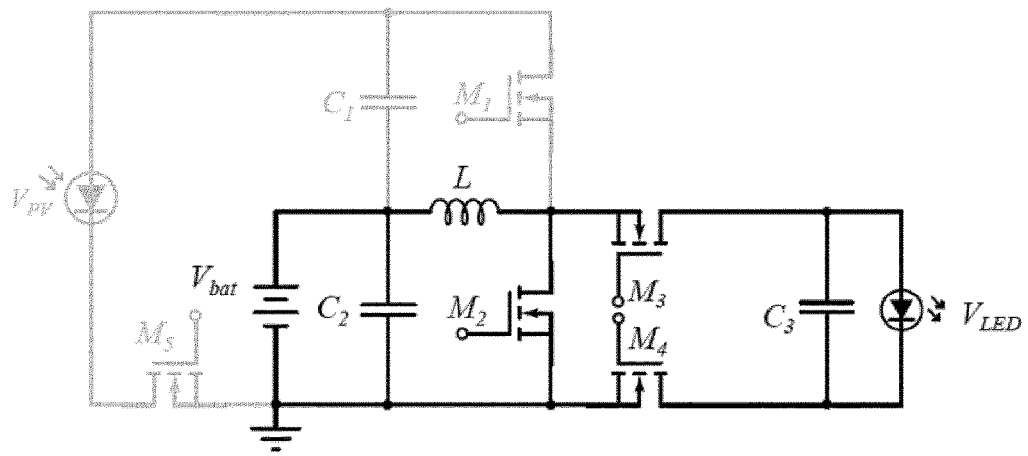
FIG. 3c shows the three-port converter in FIG. 3a, wherein the secondary side circuit, configured for operating as a boost converter, is highlighted.

A further aspect of the presently disclosed invention relates to the three-port direct current converter being configured to operate without diodes. Synchronous rectification, or active rectification, is a technique for improving the efficiency of rectification by replacing diodes with actively controlled switches such as transistors. In low voltage converters, the voltage drop of a diode has an adverse effect on efficiency. Replacing a diode with an actively controlled switching element such as a MOSFET is the heart of synchronous rectification. MOSFETs have a constant very low resistance when conducting. The voltage drop across the transistor is then much lower, meaning a reduction in power loss and a gain in efficiency. The drawback of this technique is that typically extra gate control signals are needed for controlling the MOSFETs. In one embodiment of the present inventions all the switches are active switches in order to reduce voltage drops in the power flow path, where M5 and M4 are power flow path configuration switches, M2 acts as synchronous rectifier in buck mode and M3 operates as synchronous rectifier in boost/tapped boost mode. By combining the topology of the present invention, in which a single magnetic component is shared by a primary side circuit and a secondary side circuit, and synchronous rectification, a further optimized topology can be obtained, in which one MOSFET $M_2$ is shared between the primary side circuit and the secondary side circuit. Therefore, a MOSFET $M_2$ may be shared between the primary side circuit and the secondary side circuit, which also means that it is shared between the two power flow configurations. FIG. 3a shows the topology, wherein the primary side circuit and a secondary side circuit share an inductor L and a MOSFET $M_2$. FIGS. 3b and 3c show the circuit being used as a buck converter and a boost converter respectively. This means that both a magnetic component, such as L, and a MOSFET, such as $M_2$, may be shared between the primary side circuit and a secondary side circuit according to the present invention, wherein L is the only magnetic component of the three-port direct current converter (unless the secondary side circuit is configured to operate as a tapped-boost converter, which means that a second inductor is serially coupled to the first inductor). As previously stated, the shared magnetic component regulates a first output voltage of the primary side circuit in the first power flow configuration, and regulates a second output voltage of the secondary side circuit in the second power flow configuration. In this embodiment $M_2$ actively controls the current and voltage of the inductor in both power flow configurations.

A further effect of the proposed topology is that the MOSFETs are simpler to drive compared to a conventional three-port converter. As stated, MOSFET $M_2$ may be shared between the primary side circuit and the secondary side circuit. In one embodiment there are four other MOSFETs $M_1$, $M_3$, $M_4$ and $M_5$, of which only two ($M_1$ and $M_3$) have to be dynamically driven by pulse-width modulators since $M_4$ and $M_5$ only have two states (on/off) and never change state in a power flow configuration. FIG. 3 shows this embodiment. During the time the solar energy is not available, MOSFET $M_5$ is turned off and $M_4$ is active, so the battery port powers the LED output as shown in FIG. 3c. When the renewable energy source is available, MOSFET $M_5$ is active and $M_4$ is turned off so the converter processes the energy from the photovoltaic panel to the battery side as shown in FIG. 3b. Therefore, $M_4$ and $M_5$ do not require pulse-width modulators.

In one embodiment of the present invention, the three-port direct current converter comprises a MOSFET $M_1$ configured to control the current and voltage of the at least one single magnetic component. The single magnetic component in this embodiment is preferably the inductor L. As previously stated, the shared magnetic component regulates a first output voltage of the primary side circuit in the first power flow configuration. In this embodiment $M_1$ actively controls the current and voltage of the inductor in the first power flow configuration. In another (or within the same) embodiment, the secondary side circuit comprising a MOSFET $M_3$ between the first inductor and the at least one load. If the converter is configured to operate as a tapped-boost converter, i.e. having a second inductor serially coupled to the first inductor as showed in FIG. 4a, the MOSFET $M_3$ may be placed between the first inductor $L_{1A}$ and the second inductor $L_{1B}$. As previously stated, the shared magnetic component regulates a second output voltage of the second side circuit in the second power flow configuration. In this embodiment $M_3$ actively controls the current and voltage of the inductor in the second power flow configuration.

A further embodiment of the present invention relates to a system, such as a street light, or a path light, or a guiding light, or a garden light or decorative light comprising the three-port direct current converter described above. These are applications that would benefit from a stand-alone off-grid system according to the present invention. Such a system provides flexibility in terms of positioning of the system and eliminates the cost of cables etc. The presently disclosed three-port converter offers improved power density, weight and price in comparison to convention three-port converters. Street light in this context shall be interpreted broadly and includes any kind of street light or lighting, also for indoor purposes or lights placed e.g. directly on the ground, e.g. to light pavements or buildings. Path lights are used to light paths or guide roads or paths in e.g. gardens, parks and urban environment. The system may also be integrated into urban furniture, such as benches, bike racks and the like. The system may also serve as light decoration, and can also be used for indication purposes, for example to indicate security or emergency equipment, such as rescue ladders or emergency doors. Other examples of applications are as indications of runways for airplanes or mounted on buoys in the sea for orientation purposes. The three-port converter according to the present invention is not limited to lighting applications. The at least one load in the secondary side circuit could be any electrical component that consumes electric power, and the current source in the primary side circuit could be any direct current source.

EXAMPLES

FIG. 1 shows a conventional three-port converter having an input power source 1, a battery 3 and a load 2. The design of the three-port converter is complex and requires a large number of electrical components. In the conventional three-port converter there is a direct power flow 4 from the power input to the load.

Figure 2:
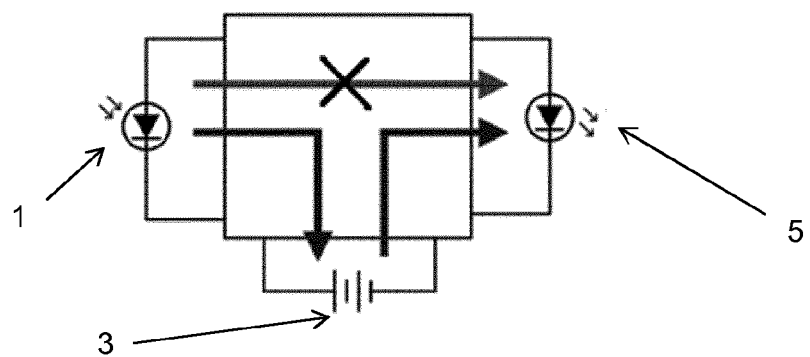
FIG. 2 is a conceptual drawing of a three-port converter according to the present invention having an input power source, a battery and a load, wherein the three-port direct current converter is configured to operate in two mutually exclusive power flow configurations.

FIG. 2 is a conceptual drawing of a three-port converter according to the present invention having an input power source 1, a battery 3 and a light-emitting diode 5, which constitutes the load, wherein the three-port direct current converter is configured to operate in two mutually exclusive power flow configurations. This design corresponds to an electrical circuit having a primary side circuit comprising a connection between the at least one input direct current source and the at least one storage battery, the primary side circuit configured for operating as a buck converter, and having a secondary side circuit comprising a connection between the at least one storage battery and at least one load, the secondary side configured for operating as a boost converter, and wherein the three-port direct current converter is configured to operate in two mutually exclusive power flow configuration. A single magnetic component is shared by the primary side circuit and the secondary side circuit. A consequence of the proposed topology is that there is no direct power flow from the power input to the load.

FIG. 3a shows an embodiment of a three-port converter according to the present invention, wherein a single magnetic component (L) is shared by the primary side circuit and the secondary side circuit. In this embodiment there is MOSFET $M_5$ with one side connected to ground (node $n_1$). On the other side of $M_5$ seen from the ground, there is a photovoltaic input power source $V_{PV}$ connected serially to $M_5$, wherein there is a node $n_2$ on the other side of $V_{PV}$. Also connected to n1 are: the battery $V_{bat}$, a capacitor $C_2$, wherein the sides of $V_{bat}$ and $C_2$ (fronting away from the ground) are joined in a node 3. Also connected to $n_1$ are a MOSFET $M_2$, defining a node $n_4$ on the opposite side of $M_2$ compared to the ground, and a MOSFET $M_4$, defining a node $n_5$ on the opposite side of $M_4$ compared to the ground. Furthermore there is a capacitor $C_1$ between $n_2$ and $n_3$, an inductor L between $n_3$ and $n_4$, and a MOSFET $M_1$ between $n_2$ and $n_4$. There is also a MOSFET $M_3$ with one end connected to $n_4$ and one end defining a node $n_6$. A capacitor $C_3$ and a light-emitting diode $V_{LED}$ are connected in parallel between nodes $n_5$ and $n_6$.

FIG. 3b shows the three-port converter in FIG. 3a, wherein the primary side circuit, configured for operating as a buck converter, is highlighted. The components from FIG. 3a that are active in this configuration are $V_{PV}$, $M_5$, $V_{bat}$, $C_1$, $M_1$, L, $M_2$ and $C_2$.

FIG. 3c shows the three-port converter in FIG. 3a, wherein the secondary side circuit, configured for operating as a boost converter, is highlighted. The components from FIG. 3a that are active in this configuration are $V_{LED}$, $C_3$, $M_3$, $M_4$, L, $M_2$ and $C_2$. Thus, the component that are active both in the primary side circuit and the the secondary side circuit are: L, $M_2$ and $C_2$.

Figure 4A:
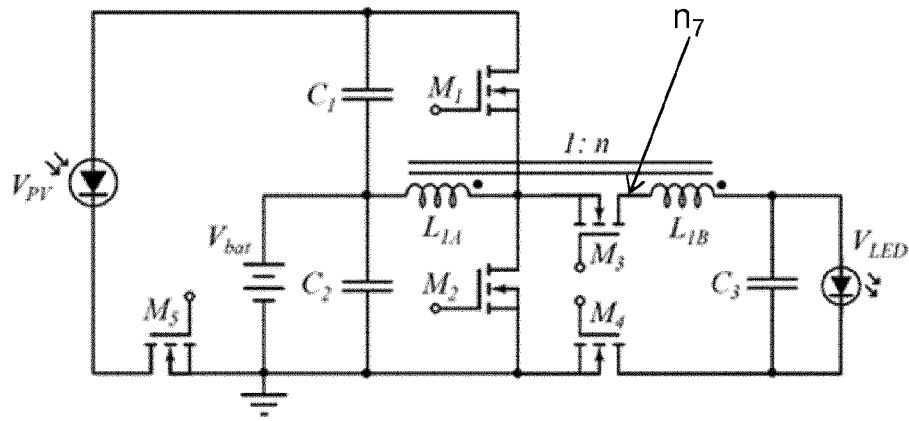
FIG. 4a shows an embodiment of a three-port converter according to the present invention, wherein a magnetic component ($L_{1A}$) is shared by the primary side circuit and the secondary side circuit. In this embodiment there is a second optional magnetic component ($L_{1B}$) serially coupled to the first inductor to perform a voltage step-up of the second output voltage.

FIG. 4a shows an embodiment of a three-port converter according to the present invention, wherein a single magnetic component ($L_{1A}$) is shared by the primary side circuit and the secondary side circuit. The principle is the same as in FIG. 3, but in this embodiment there is a second magnetic component ($L_{1B}$) serially coupled to the first inductor through a node n7 to perform a voltage step-up of the second output voltage. In this embodiment M3 is located between the nodes n4 and n7, and the second optional magnetic component ($L_{1B}$) is located between nodes n7 and n6.

Figure 4B:
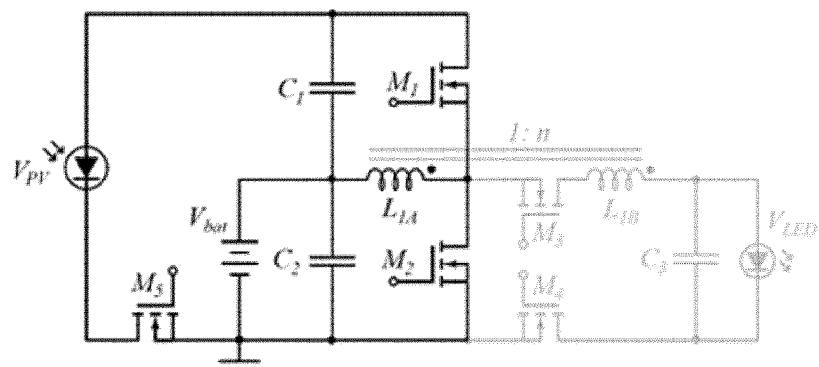
FIG. 4b shows the three-port converter in FIG. 4a, wherein the primary side circuit, configured for operating as a buck converter, is highlighted.

FIG. 4b shows the three-port converter in FIG. 4a, wherein the primary side circuit, configured for operating as a buck converter, is highlighted.

Figure 4C:
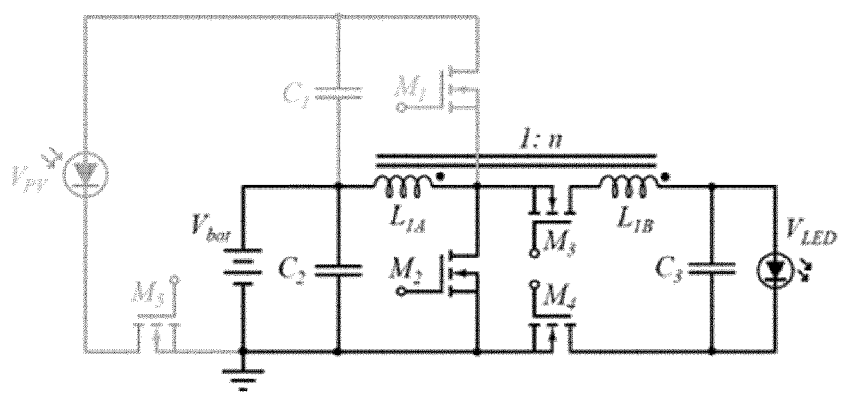
FIG. 4c shows the three-port converter in FIG. 4a, wherein the secondary side circuit, configured for operating as a tapped boost converter, is highlighted. In this embodiment there is a second optional magnetic component ($L_{1B}$) serially coupled to the first inductor to perform a voltage step-up of the second output voltage.

FIG. 4c shows the three-port converter in FIG. 4a, wherein the secondary side circuit, configured for operating as a tapped boost converter, is highlighted. In this embodiment there is a second optional magnetic component ($L_{1B}$) serially coupled to the first inductor to perform a voltage step-up of the second output voltage.

Figure 5:
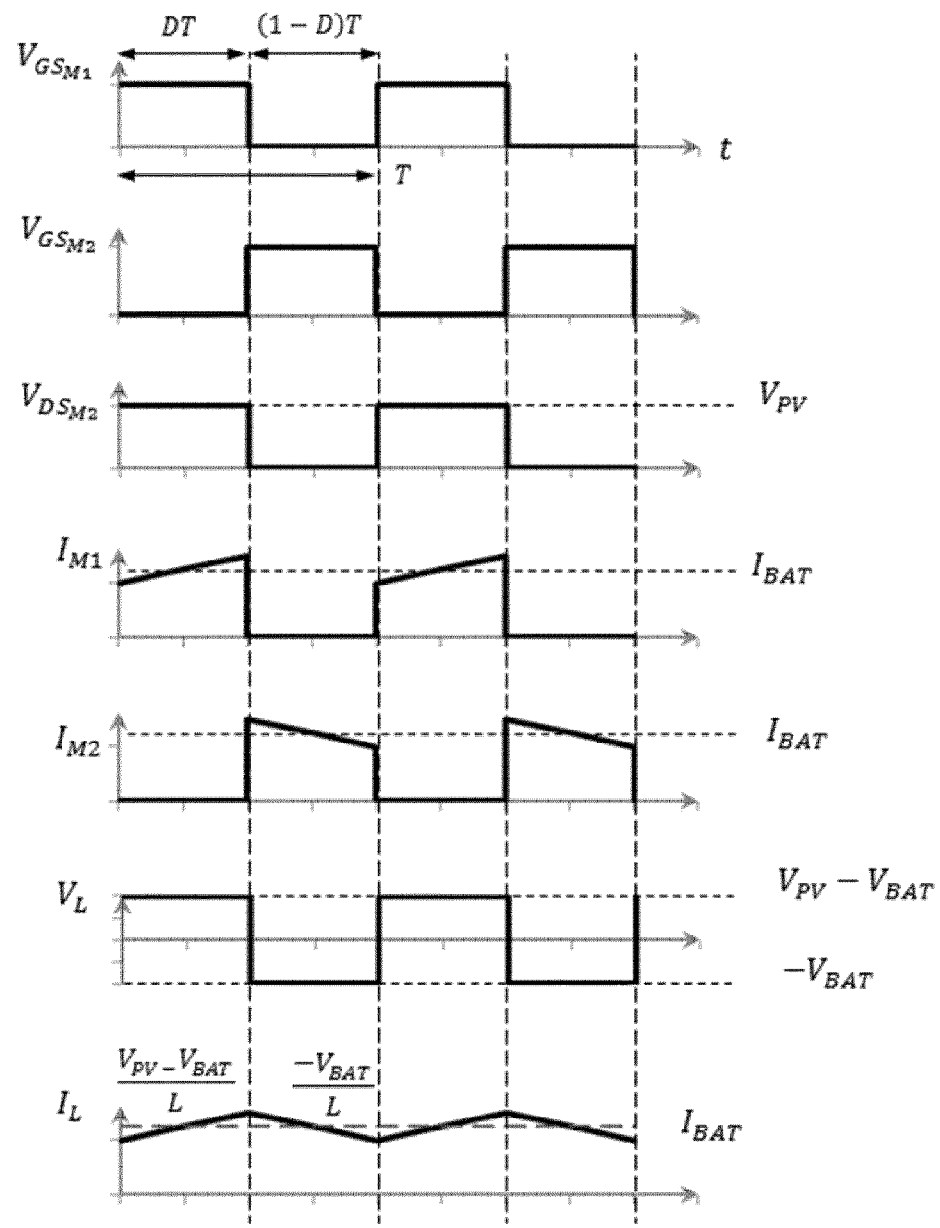
FIG. 5 shows a three-port converter according to the present invention operating as a buck converter.

FIG. 5 shows a three-port converter according to the present invention operating as a buck converter, with ideal operating waveforms. Switch $M_5$ is constantly on and switch $M_4$ is constantly off. From top to bottom: Gate-to-source voltage $V_{GS}$ of switches $M_1$ and $M_2$, respectively, drain-to-source voltage $V_{DS}$ of switch $M_2$, current through switches $M_1$ and $M_2$, $I_{M1}$ and $I_{M2}$, respectively, inductor voltage $V_L$ and inductor current $I_L$.

Figure 6:
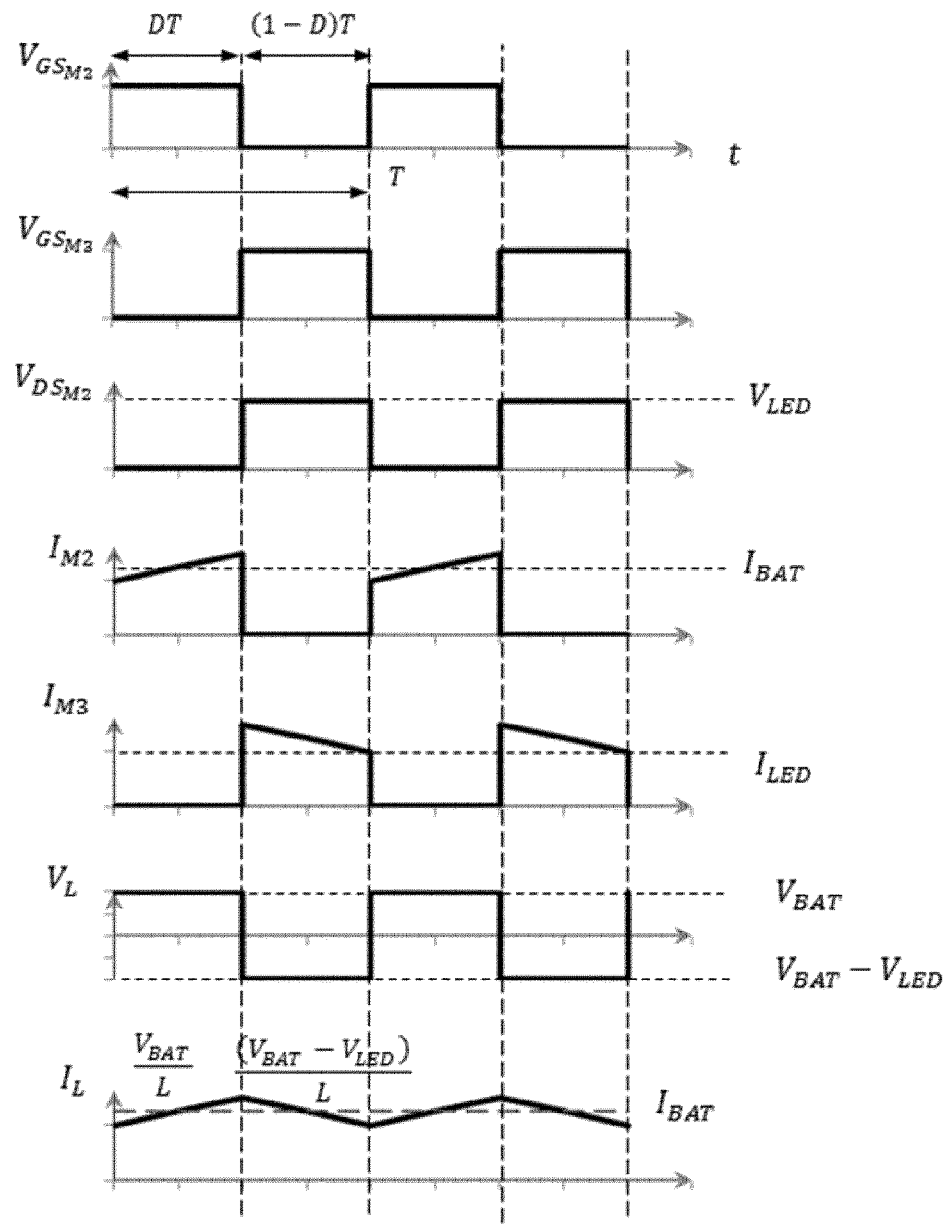
FIG. 6 shows a three-port converter according to the present invention operating as a boost converter.

FIG. 6 shows a three-port converter according to the present invention operating as a boost converter, with ideal operating waveforms. Switch $M_4$ is constantly on and switch $M_5$ is constantly off. From top to bottom: Gate-to-source voltage $V_{GS}$ of switches $M_2$ and $M_3$, respectively, drain-to-source voltage $V_{DS}$ of switch $M_2$, current through switches $M_2$ and $M_3$, $I_{M2}$ and $I_{M3}$ respectively, inductor voltage $V_L$ and inductor current $I_L$.

Figure 7:
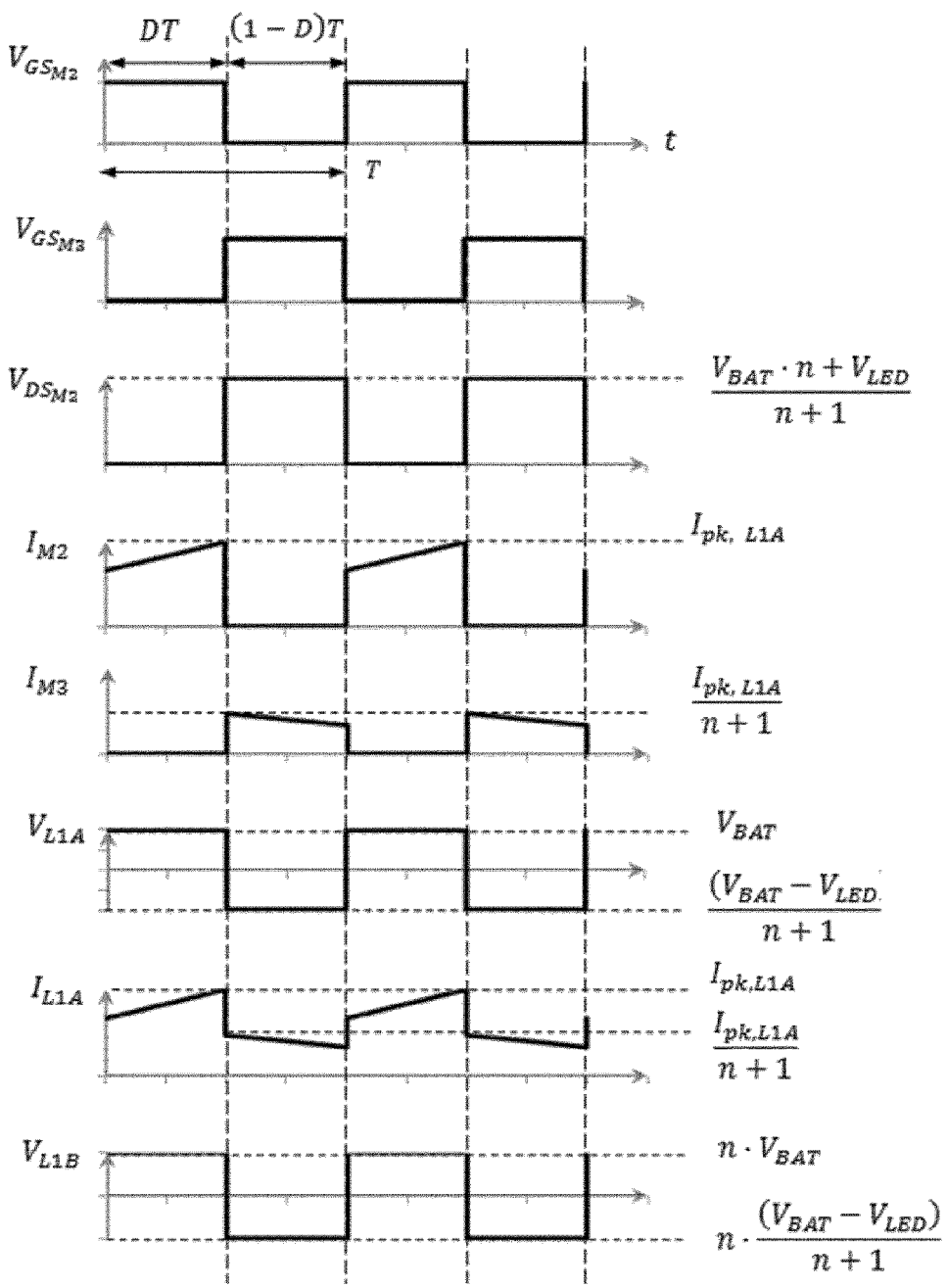
FIG. 7 shows a three-port converter according to the present invention operating as a tapped-boost converter.

FIG. 7 shows a three-port converter according to the present invention operating as a tapped-boost converter, with ideal operating waveforms. Switch $M_4$ is constantly on and switch $M_5$ is constantly off. From top to bottom: Gate-to-source voltage $V_{GS}$ of switches $M_2$ and $M_3$, respectively, drain-to-source voltage $V_{DS}$ of switch $M_2$, current through switches $M_2$ and $M_3$, $I_{M2}$ and $I_{M3}$ respectively, inductor $L_{1A}$ voltage $V_{L1A}$ and current $I_{L1A}$ and inductor $L_{1B}$ voltage $V_{L1B}$ and current $I_{L1B}$.

Figure 8A:
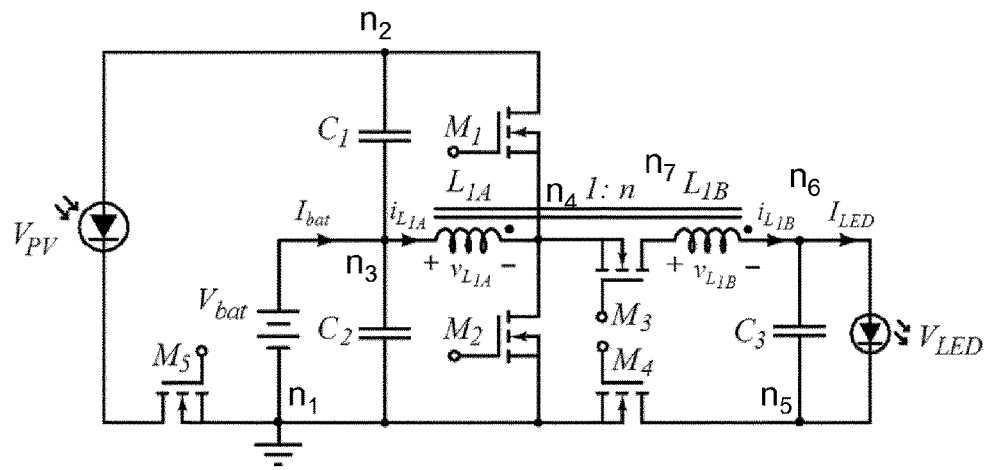
FIG. 8a shows an embodiment of a three-port converter according to the present invention having coupled inductors $L_{1A}$ and $L_{1B}$.

FIG. 8a shows an embodiment of a three-port converter according to the present invention, wherein a single magnetic component ($L_{1A}$) is shared by the primary side circuit and the secondary side circuit. In this embodiment there is a MOSFET $M_5$ with one side connected to ground (node $n_1$). On the other side of $M_5$ seen from the ground, there is a photovoltaic input power source $V_{PV}$ connected serially to $M_5$, wherein there is a node $n_2$ on the other side of $V_{PV}$. Also connected to n1 are: the battery $V_{bat}$, a capacitor $C_2$, wherein the sides of $V_{bat}$ and $C_2$ (fronting away from the ground) are joined in a node 3. Also connected to $n_1$ are a MOSFET $M_2$, defining a node $n_4$ on the opposite side of $M_2$ compared to the ground, and a MOSFET $M_4$, defining a node $n_5$ on the opposite side of $M_4$ compared to the ground. Furthermore there is a capacitor $C_1$ between $n_2$ and $n_3$, an inductor $L_{1A}$ between $n_3$ and $n_4$, and a MOSFET $M_1$ between $n_2$ and $n_4$. There is also a MOSFET $M_3$ with one end connected to $n_4$ and one end defining a node $n_7$. The circuit has a second inductor $L_{1B}$ serially coupled to $L_{1A}$ between $n_7$ and a new node $n_6$. A capacitor $C_3$ and a light-emitting diode $V_{LED}$ are connected in parallel between nodes $n_5$ and $n_6$.

Figure 8B:
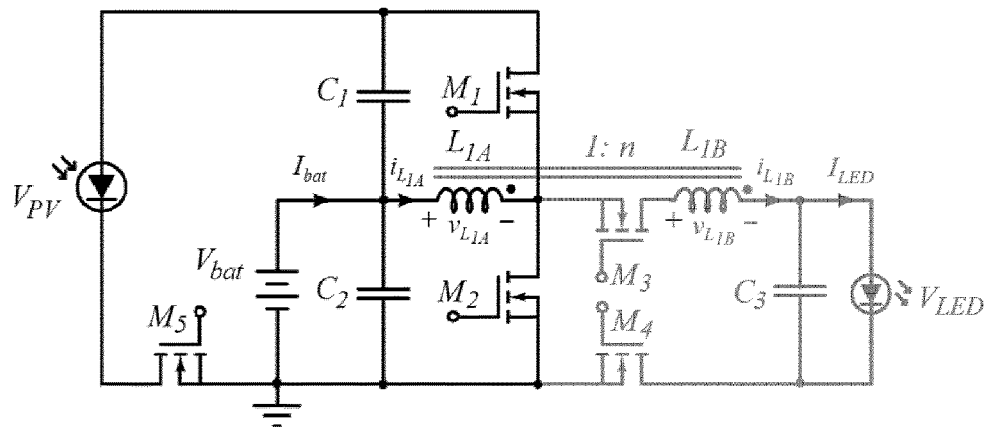
FIG. 8b shows the three-port converter of FIG. 8a in buck mode.

FIG. 8b shows the three-port converter in FIG. 8a, wherein the primary side circuit, configured for operating as a buck converter, is highlighted.

Figure 8C:
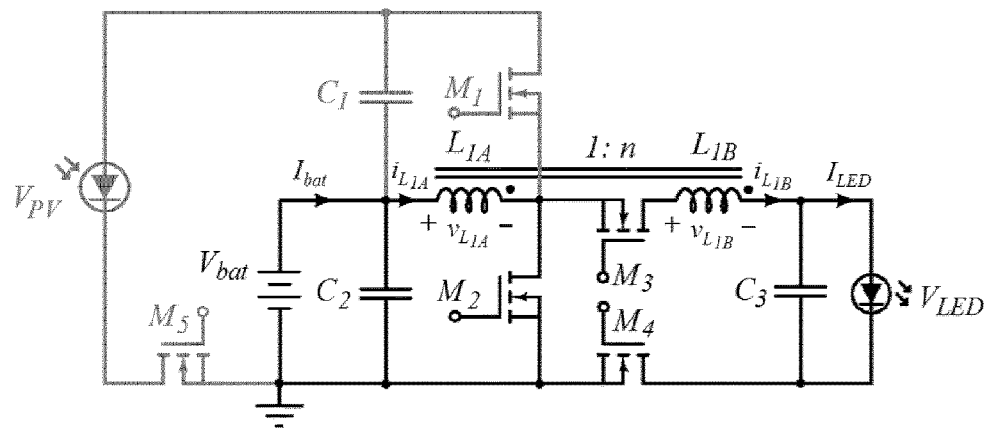
FIG. 8c shows the three-port converter of FIG. 8a in tapped boost mode.

FIG. 8c shows the three-port converter in FIG. 8a, wherein the secondary side circuit, configured for operating as a tapped boost converter, is highlighted. In this embodiment there is a second optional magnetic component ($L_{1B}$) serially coupled to the first inductor to perform a voltage step-up of the second output voltage.

Figure 9A:
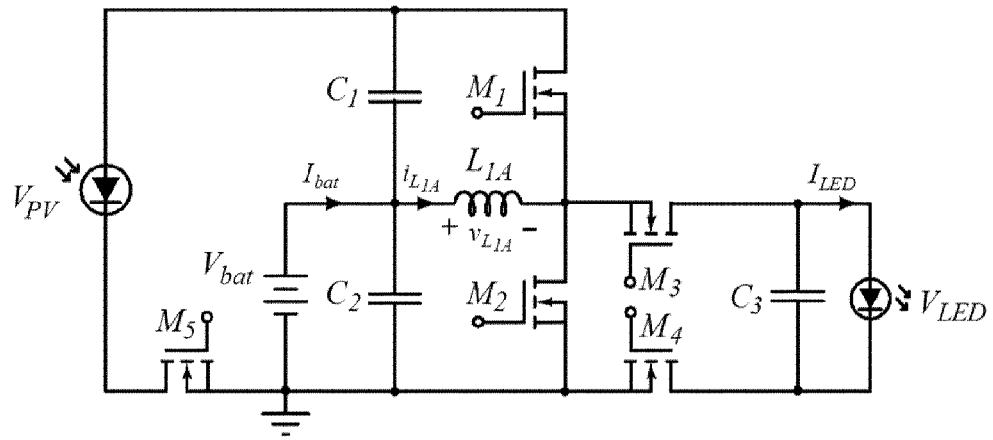
FIG. 9a shows an embodiment of a three-port converter according to the present invention, wherein $L_{1B}$ is replaced by a short circuit.

FIG. 9a shows an embodiment of a three-port converter according to the present invention, wherein $L_{1B}$ is replaced by a short circuit.

Figure 9B:
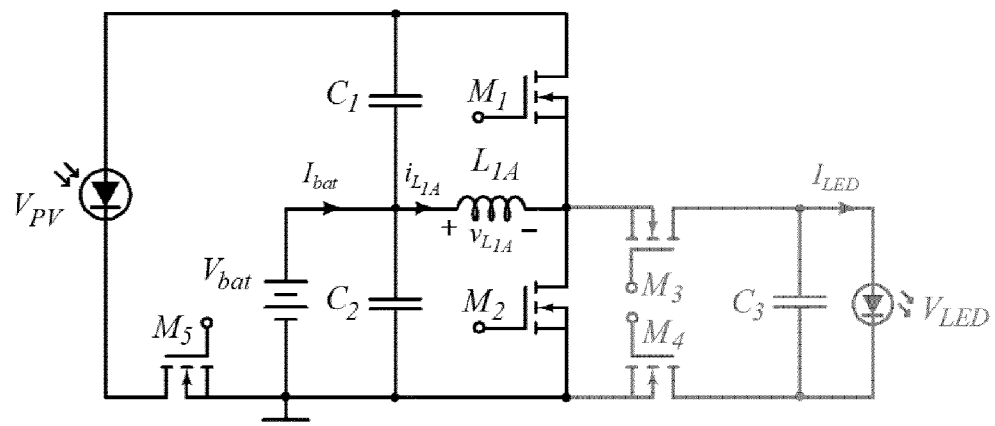
FIG. 9b shows the three-port converter of FIG. 9a in buck mode.

FIG. 9b shows the three-port converter of FIG. 9a in buck mode.

Figure 9C:
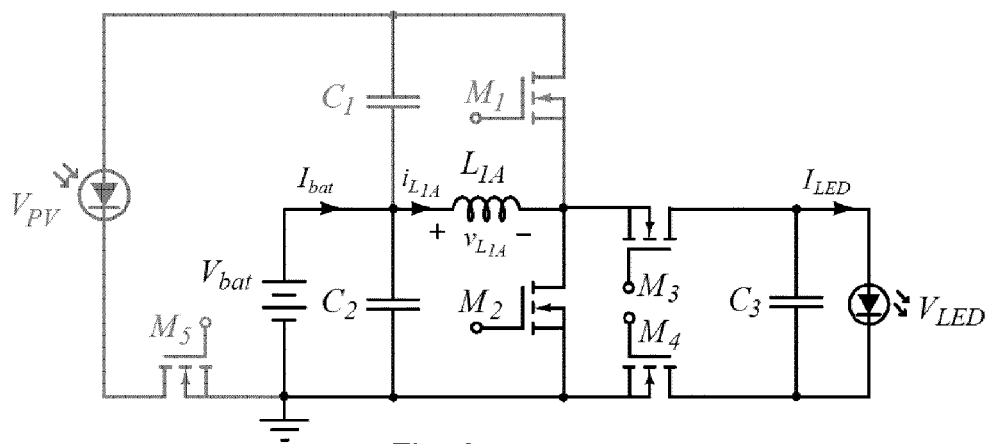
FIG. 9c shows the three-port converter in FIG. 9a in boost mode.

FIG. 9c shows the three-port converter in FIG. 9a in boost mode.

Figure 10:
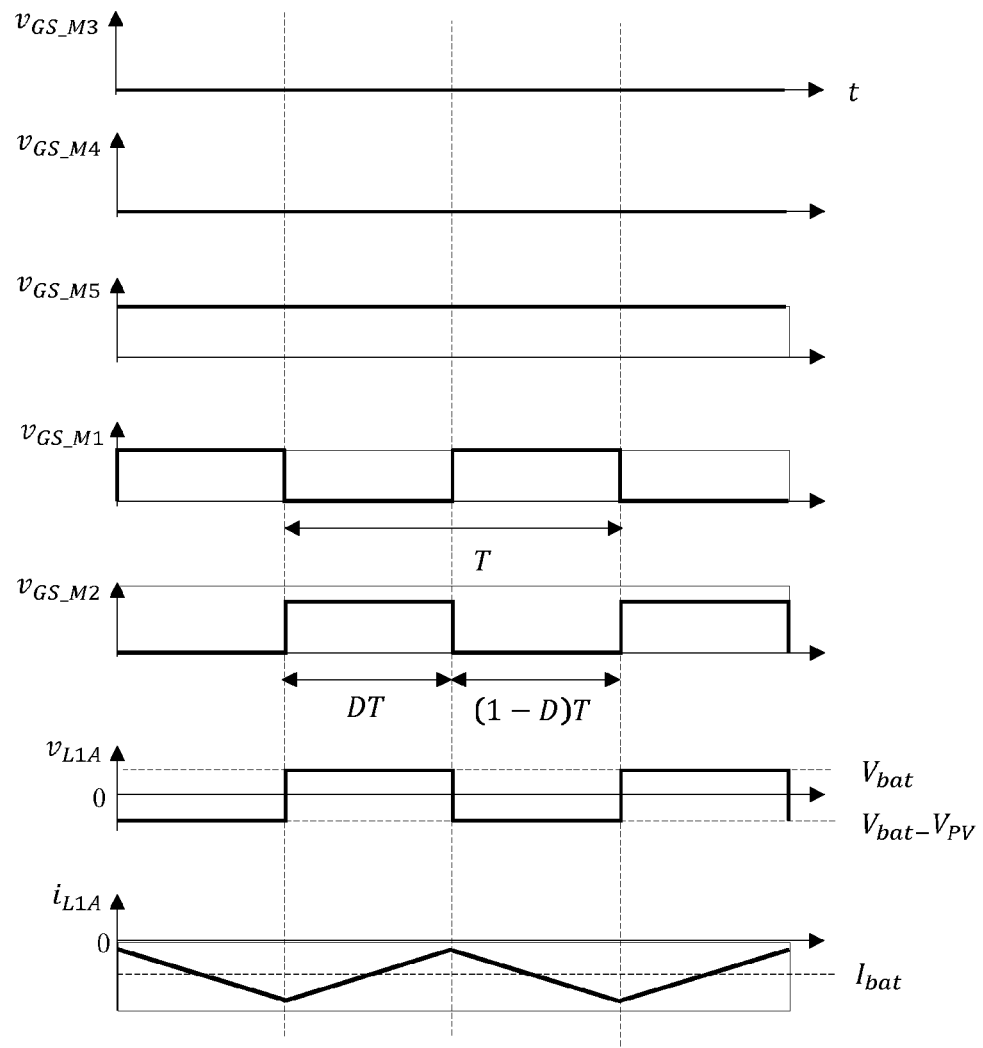
FIG. 10 shows waveforms of a three-port converter with coupled inductors in buck mode.

FIG. 10 shows a three-port converter according to the present invention operating as a buck converter. Switch $M_5$ is constantly on and switch $M_4$ and $M_3$ are constantly off. From top to bottom: Gate-to-source voltage $V_{GS}$ of switches $M_1$ and $M_2$, respectively, voltage $V_{L1A}$ over the single magnetic component ($L_{1A}$) and inductor current $I_{L1A}$.

Figure 11:
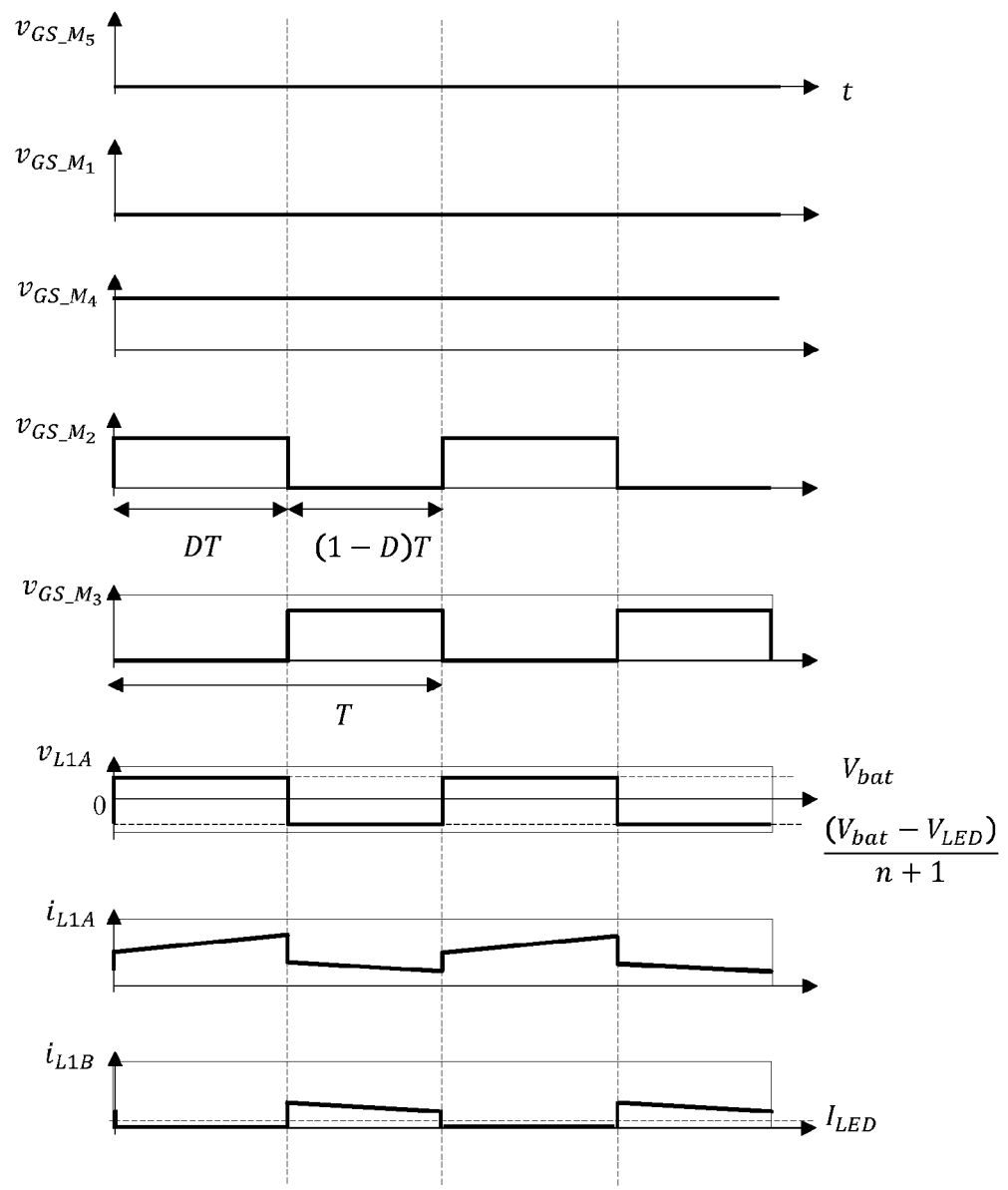
FIG. 11 shows waveforms of a three-port converter with coupled inductors in tapped boost mode.

FIG. 11 shows a three-port converter according to the present invention operating as a tapped-boost converter. Switch $M_4$ is constantly on and switch $M_5$ and $M_1$ are constantly off. From top to bottom: Gate-to-source voltage $V_{GS\_M}2$ and $V_{GS\_M}3$ of switches $M_2$ and $M_3$, respectively, voltage $V_{L1A}$ over the single magnetic component ($L_{1A}$) and inductor current $I_{L1A}$, and inductor current $I_{L1B}$ over the second inductor $L_{1B}$.

Figure 12:
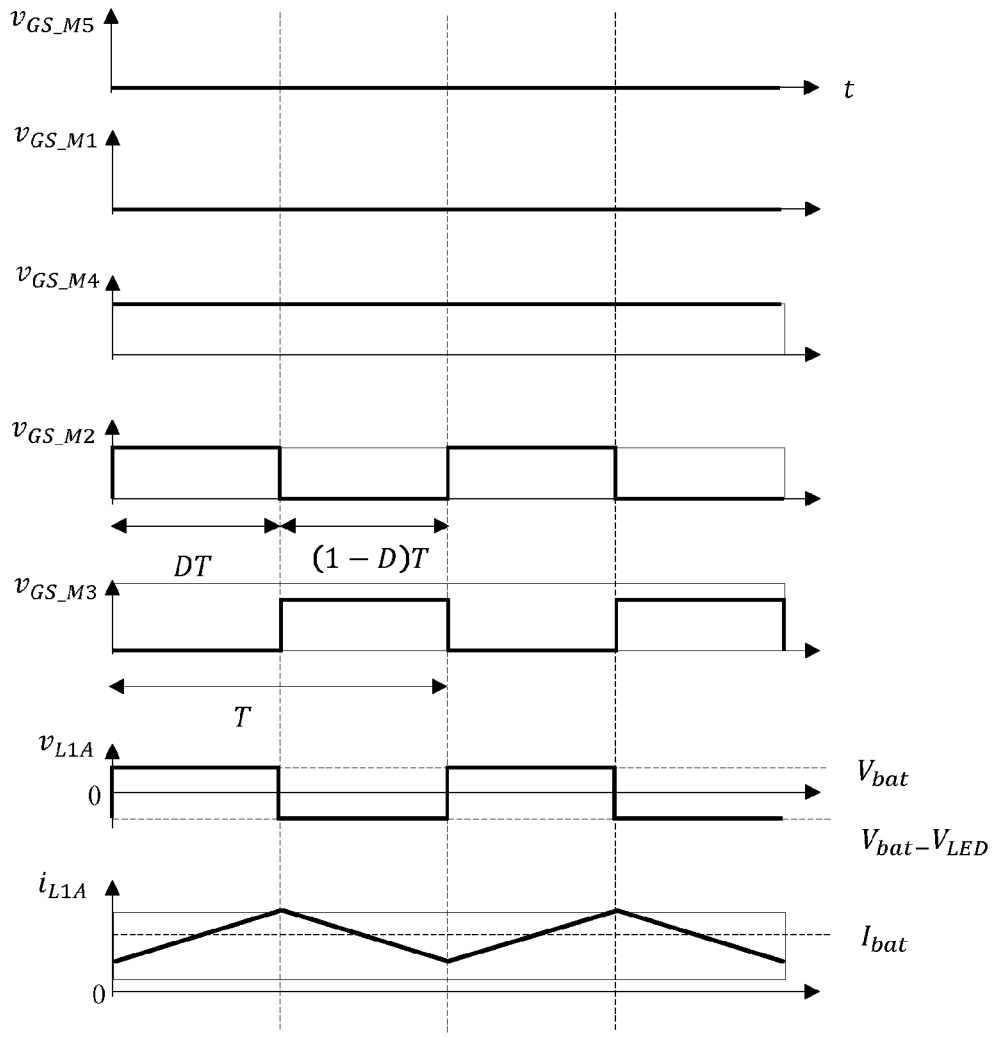
FIG. 12 shows waveforms of a three-port converter with a single inductor in boost mode.

FIG. 12 shows a three-port converter according to the present invention operating as a boost converter. Switch $M_4$ is constantly on and switch $M_5$ and $M_1$ are constantly off. From top to bottom: Gate-to-source voltage $V_{GS}$ of switches $M_2$ and $M_3$, respectively, voltage $V_{L1A}$ over the single magnetic component ($L_{1A}$), and current $I_{L1A}$ through the single magnetic component ($L_{1A}$).

Further Details of the Invention

1. A three-port direct current converter comprising:
   at least one input direct current source;
   at least one storage battery;
   a primary side circuit;
   a secondary side circuit;
   a single magnetic component shared by the primary side circuit and the secondary side circuit,
wherein the primary side circuit comprises a connection between the at least one input direct current source and the at least one storage battery, the primary side circuit configured for operating as a buck converter,
wherein the secondary side circuit comprises a connection between the at least one storage battery and at least one load, the secondary side configured for operating as a boost converter,
and wherein the three-port direct current converter is configured to operate in two mutually exclusive power flow configurations.

2. The three-port direct current converter according to any of the preceding claims, wherein the three-port direct current converter operates as a buck converter charging the at least one storage battery in a first power flow configuration, and the three-port direct current converter operates as a boost converter driving the at least one load in a second power flow configuration.

3. The three-port direct current converter according to any of the preceding claims, wherein the magnetic component regulates a first output voltage of the primary side circuit in the first power flow configuration, and wherein the magnetic component regulates a second output voltage of the secondary side circuit in the second power flow configuration.

4. The three-port direct current converter according to any of the preceding claims, wherein the three-port direct current converter operates as a voltage step down and current step up converter in a first power flow configuration.

5. The three-port direct current converter according to any of the preceding claims, wherein the first output voltage is regulated to match a predefined voltage range of the at least one storage battery.

6. The three-port direct current converter according to any of the preceding claims, wherein the second output voltage is regulated to match a predefined voltage range of the at least one load.

7. The three-port direct current converter according to any of the preceding claims, wherein the three-port direct current converter is configured to operate without a direct power flow from the at least one input direct current source to the at least one load.

8. The three-port direct current converter according to any of the preceding claims, wherein the three-port direct current converter is configured to operate with one single magnetic component.

9. The three-port direct current converter according to any of the preceding claims, wherein the single magnetic component is the only magnetic component of the three-port direct current converter.

10. The three-port direct current converter according to any of the preceding claims, wherein the magnetic component is a first inductor.

11. The three-port direct current converter according to any of the preceding claims, the secondary side circuit comprising a second inductor serially coupled to the first inductor, wherein the first and second inductors are configured to perform a voltage step-up of the second output voltage.

12. The three-port direct current converter according to claim 0, wherein said secondary side is configured to operate as a tapped boost converter.

13. The three-port direct current converter according to any of the preceding claims, wherein the at least one input direct current source comprises a photovoltaic panel.

14. The three-port direct current converter according to any of the preceding claims, wherein the at least one load comprises a light-emitting diode.

15. The three-port direct current converter according to claim 8, wherein the three-port direct current converter is configured to dim the light-emitting diode according to a state of charge requirement of the at least one storage battery.

16. The three-port direct current converter according to any of the preceding claims, wherein the secondary side circuit comprises parallel-connected loads.

17. The three-port direct current converter according to any of the preceding claims, wherein the secondary side circuit comprises multiple loads.

18. The three-port direct current converter according to claim 17, wherein the loads are regulated independently.

19. The three-port direct current converter according to any of the preceding claims, wherein the three-port direct current converter is configured to operate without diodes.

20. The three-port direct current converter according to any of the preceding claims, wherein the three-port direct current converter comprises actively controlled switching elements configured to control power flows of three-port direct current converter.

21. The three-port direct current converter according to claim 9, wherein the actively controlled switching elements are metal-oxide-semiconductor field-effect transistors (MOSFETs).

22. The three-port direct current converter according to any of claims 9-9, wherein a MOSFET $M_2$ is shared between the primary side circuit and the secondary side circuit.

23. The three-port direct current converter according to any of the preceding claims, the secondary side circuit comprising a MOSFET $M_3$ between the first inductor and the at least one load.

24. The three-port direct current converter according to any of claims 9-11, the three-port direct current converter comprising a MOSFET $M_5$ configured to enable and disable the first power flow configuration, such that when $M_5$ is turned on energy is processed from the at least one input direct current source to the at least one storage battery.

25. The three-port direct current converter according to any of claims 9-12, the three-port direct current converter comprising a MOSFET $M_4$ configured to enable and disable the second power flow configuration, such that when $M_4$ is turned on the at least one storage battery powers the at least one load.

26. The three-port direct current converter according to any of claims 9-12, the three-port direct current converter comprising a MOSFET $M_1$ configured to control the current and voltage of the at least one single magnetic component.

27. The three-port direct current converter according to any of claims 9-13, wherein $M_1$, $M_2$ and $M_3$ are driven by pulse-width modulated signals, and $M_4$ and $M_5$ are driven by enable/disable signals that do not vary within the power flow configurations.

28. A system, such as a street light, or a path light, or a guiding light, or a garden light or decorative light, comprising the three-port direct current converter according to any of claims 1-14.

The invention claimed is:

1. A three-port direct current converter comprising:
   at least one input direct current source;
   at least one storage battery;
   a primary side circuit having a connection between the at least one input direct current source and the at least one storage battery, the primary side circuit configured for operating as a buck converter;
   a secondary side circuit having a connection between the at least one storage battery and at least one load, the secondary side configured for operating as a boost converter;
   a single magnetic component shared by the primary side circuit and the secondary side circuit; and
   actively controlled switching elements configured to control power flows of the three-port direct current converter, the actively controlled switching elements being metal-oxide-semiconductor field-effect transistors (MOSFETs),
   wherein the three-port direct current converter is configured to operate in two mutually exclusive power flow configurations and a MOSFET M2 is shared between the primary side circuit and the secondary side circuit.

2. The three-port direct current converter according to claim 1, wherein the three-port direct current converter operates as a voltage step down and current step up converter in a first power flow configuration.

3. The three-port direct current converter according to claim 1, wherein the second output voltage is regulated to match a predefined voltage range of the at least one load.

4. The three-port direct current converter according to claim 1, wherein the three-port direct current converter is configured to operate without a direct power flow from the at least one input direct current source to the at least one load.

5. The three-port direct current converter according to claim 1, wherein the single magnetic component is a first inductor.

6. The three-port direct current converter according to claim 5, wherein the secondary side circuit comprises a MOSFET M3 between the first inductor and the at least one load.

7. The three-port direct current converter according to claim 1, wherein the at least one input direct current source comprises a photovoltaic panel, and the at least one load comprises a light-emitting diode.

8. The three-port direct current converter according to claim 1, further comprising:
   a MOSFET M5 configured to enable and disable the first power flow configuration, such that when the M5 is turned on energy is processed from the at least one input direct current source to the at least one storage battery; and
   a MOSFET M4 configured to enable and disable the second power flow configuration, such that when the M4 is turned on the at least one storage battery powers the at least one load.

9. The three-port direct current converter according to claim 1, further comprising:
   a MOSFET M1 configured to control the current and voltage of the at least one first single magnetic component.

10. The three-port direct current converter according to claim 1 comprising a light system for a street, a path, a guiding, a garden, or decoration.

11. A three-port direct current converter comprising:
    at least one input direct current source;
    at least one storage battery;
    a primary side circuit having a connection between the at least one input direct current source and the at least one storage battery, the primary side circuit configured for operating as a buck converter;
    a secondary side circuit having a connection between the at least one storage battery and at least one load, the secondary side configured for operating as a boost converter;
    a single magnetic component shared by the primary side circuit and the secondary side circuit;
    actively controlled switching elements configured to control power flows of the three-port direct current converter, the actively controlled switching elements being metal-oxide-semiconductor field-effect transistors (MOSFETs);
    a MOSFET M2 is shared between the primary side circuit and the secondary side circuit;
    the secondary side circuit comprises a MOSFET M3 between the first inductor and the at least one load;
    further comprising:
      a MOSFET M5 configured to enable and disable the first power flow configuration, such that when the M5 is turned on energy is processed from the at least one input direct current source to the at least one storage battery;
      a MOSFET M4 configured to enable and disable the second power flow configuration, such that when the M4 is turned on the at least one storage battery powers the at least one load; and
      a MOSFET M1 configured to control the current and voltage of the at least one first single magnetic component;
    wherein M1, M2 and M3 are driven by pulse-width modulated signals, M4 and M5 are driven by enable/disable signals that do not vary within the power flow configurations, and the three-port direct current converter is configured to operate in two mutually exclusive power flow configurations.

12. A three-port direct current converter comprising:
    at least one input direct current source;
    at least one storage battery;
    a primary side circuit having a connection between the at least one input direct current source and the at least one storage battery, the primary side circuit configured for operating as a buck converter;
    a secondary side circuit having a connection between the at least one storage battery and at least one load, the secondary side configured for operating as a tapped boost converter;
    a single magnetic component shared by the primary side circuit and the secondary side circuit;

a second magnetic component serially coupled to the first single magnetic component, the first and second magnetic components configured to perform a voltage step-up, wherein the three-port direct current converter is configured to operate in two mutually exclusive power flow configurations and the single magnetic component is a first single magnetic component shared by the primary side circuit and the secondary side circuit.

13. The three-port direct current converter according to claim 12, wherein:

the first single magnetic component regulates a first output voltage of the primary side circuit in the first power flow configuration; and the first and second magnetic components regulate a second output voltage of the secondary side circuit in the second power flow configuration.

14. The three-port direct current converter according to claim 13, wherein the first output voltage is lower than the second output voltage.

* * * * *